United States Patent
Snopko et al.

(10) Patent No.: US 11,394,323 B2
(45) Date of Patent: Jul. 19, 2022

(54) GENERATOR CONTROL SYSTEMS AND METHODS

(71) Applicant: Caterpillar Inc., Peoria, IL (US)

(72) Inventors: Michael A. Snopko, Washington, IL (US); David M. Miller, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 497 days.

(21) Appl. No.: 16/561,210

(22) Filed: Sep. 5, 2019

(65) Prior Publication Data
US 2021/0075351 A1    Mar. 11, 2021

(51) Int. Cl.
*H02P 9/10*    (2006.01)
*H02J 3/18*    (2006.01)
*H02J 3/00*    (2006.01)

(52) U.S. Cl.
CPC ........... *H02P 9/107* (2013.01); *H02J 3/005* (2013.01); *H02J 3/007* (2020.01); *H02J 3/1885* (2013.01); *H02J 3/003* (2020.01); *H02P 2207/03* (2013.01)

(58) Field of Classification Search
CPC ...... H02P 9/107; H02P 2207/03; H02J 3/007; H02J 3/1885; H02J 3/003; H02J 2300/10; H02J 2310/42; H02J 3/46
See application file for complete search history.

(56) References Cited

U.S. PATENT DOCUMENTS

| | | | |
|---|---|---|---|
| 7,667,347 B2 | 2/2010 | Donnelly | |
| 8,844,663 B2 | 9/2014 | Jo et al. | |
| 9,458,771 B2 | 10/2016 | Ling et al. | |
| 9,683,503 B2 | 6/2017 | Zhang et al. | |
| 9,755,458 B2 * | 9/2017 | Frampton | H02H 7/062 |
| 10,559,957 B2 * | 2/2020 | Pedersen | H02J 3/30 |
| 10,644,511 B2 * | 5/2020 | Chase | B63H 21/17 |
| 11,188,045 B2 * | 11/2021 | Reddy | H02J 13/0006 |
| 2018/0001985 A1 * | 1/2018 | Zhang | F02D 41/26 |
| 2018/0366950 A1 * | 12/2018 | Pedersen | H02J 3/30 |
| 2020/0301383 A1 * | 9/2020 | Reddy | G05B 19/042 |
| 2021/0075351 A1 * | 3/2021 | Snopko | H02J 3/1885 |
| 2021/0197935 A1 * | 7/2021 | Pedersen | B63B 79/10 |

FOREIGN PATENT DOCUMENTS

WO    2011015198 A1    2/2011

* cited by examiner

*Primary Examiner* — Pedro J Cuevas
(74) *Attorney, Agent, or Firm* — von Briesen & Roper, s.c.

(57) ABSTRACT

A method of operating a plurality of power sources is provided. The method includes operating a first power source at a first power output and operating a second power source at a second power output. The second power source has a second operational capacity greater than the first operational capacity. First transient zone parameters are determined to operate in a first transient output power range. The first transient zone parameters include a first planned power output and a second planned power output constrained to be less than the first operational capacity.

20 Claims, 4 Drawing Sheets

300 →

| | Power Source 1 (102) | Power Source 2 (104) | Combined Power Output |
|---|---|---|---|
| Operational Capacity | 304 → 500 kW | 308 → 750 kW | |
| Initial Power Output | 302 → 250 kW / 50% | 306 → 350 kW / 47% | 310 → 600 kW |
| 312 → First Transient Zone Parameters (700-750 kw) 314 → | 316 → 275 kW / 55% | 318 → 425-475 kW / 55%- 63% | 320 → 700-750 kW |
| 322 → Steady State Parameters | 324 → 270 kW / 54% | 326 → 430 kW / 57% | 328 → 700 kW |
| 312 → Second Transient Zone Parameters (1000-1030 kw) 314 → | 334 → 450 kW / 90% | 336 → 550-600 kW / 73%- 80% | 338 → 1000-1050 kW |

| | Power Source 1 (102) | Power Source 2 (104) | Combined Power Output |
|---|---|---|---|
| Operational Capacity | 304 → 500 kW | 308 → 750 kW | |
| Initial Power Output | 302 → 250 kW / 50% | 306 → 350 kW / 47% | 310 → 600 kW |
| 402 → Increased Zone Parameters 410 → (700-750 kw) | 404 → 275 kW / 55% | 406 → 425-475 kW / 56%- 63% | 408 → 700-750 kW |
| 412 → Decreased Zone Parameters 420 → (500-550 kw) | 414 → 225 kW / 45% | 416 → 275-325 kW / 37%- 43% | 418 → 500-550 kW |

GENERATOR CONTROL SYSTEMS AND METHODS

TECHNICAL FIELD

The present disclosure generally relates load share arrangements of generators.

BACKGROUND

Various power systems may include multiple generators to supply a load. For example, a vessel may be equipped with multiple power source generators that operate in parallel to supply electrical loads throughout the vessel. These generators may have different capacities, and operate in parallel via a load share arrangement.

The generators may be configured to operate at equal load sharing, for example, a smaller 500 kW capacity generator may output 250 kW of power and a larger 1000 kW capacity generator may output 500 kW of power, both operating at fifty percent of their operational capacity for a total of 750 kW supplied to the loads. However, such load sharing agreements may not be fuel efficient methods to operate the generators.

Other load sharing methods may strive to optimize fuel efficiency for the set of generators overall. However, some such methods produce undesirable swings in output power when responding to transient changes in the load.

U.S. Pat. No. 9,683,503 discloses systems and methods of managing load sharing among a plurality of power sources. Such methods include determining total power output to be directed from the plurality of power sources to at least one power consumer, and retrieving a Brake Specific Fuel Consumption (BSFC) curve associated with each of the plurality of power sources. The method may further include determining operating priorities for each of the power sources based on operating constraints associated with the respective power sources and determining a load share for each of the plurality of power sources based on at least the total power output, the BSFC curves, and the operating priorities.

Accordingly, there is still a need for improved or alternative strategies to control generators.

SUMMARY

In accordance with one aspect of the present disclosure, a method of operating a plurality of power sources is disclosed. The method includes operating a first power source in the plurality of power sources at a first power output, the first power source having a first operational capacity, and operating a second power source in the plurality of power sources at a second power output, the second power source having a second operational capacity greater than the first operational capacity. The first power output and the second power output are harnessed to produce a combined power output for an initial power demand. First transient zone parameters are determined to operate the plurality of power sources to output power in a first transient output power range that is greater than the combined power output. The first transient zone parameters include a first planned power output for the first power source and a second planned power output for the second power source, the second planned power output being constrained to be less than the first operational capacity. A sum of the first planned power output and the second planned power output is within the first transient output power range. Responsive to detecting a first transient increase to the initial power demand that is within the first transient output power range, the first power source is operated at the first planned power output and the second power source is operated at the second planned power output to meet the first transiently increased power demand.

In accordance with another aspect of the present disclosure, a system is disclosed. The system includes a first power source having a first operational capacity and operating at a first power output and a second power source having a second operational capacity, that is greater than the first operational capacity, and operating at a second power output. An electrical distribution circuit is configured to harness the first power output and the second power output to produce a combined power output for an initial power demand. A power-source controller is configured to determine increased zone parameters to operate the first power source and the second power source to output power in an increased output power range that is greater than the combined power output. The increased zone parameters include a first planned power output for the first power source and a second planned power output for the second power source that is constrained to be less than the first operational capacity. The power-source controller is further configured to determine decreased zone parameters to operate the first power source and the second power source to output power in a decreased output power range that is less than the combined power output. The decreased zone parameters include a third planned power output for the first power source and a fourth planned power output for the second power source that is constrained to be less than the first operational capacity. Either one of a transient increase of the initial power demand that is within the increased output power range and a transient decrease of the initial power demand that is within the decreased output power range is detected. Responsive to detecting the transient increase, the power-source controller causes the first power source to operate at the first planned power output and causes the second power source at the second planned power output. Responsive to detecting the transient decrease, the power-source controller causes the first power source to operate at the third planned power output and causes the second power source at the fourth planned power output.

In yet another embodiment, a vessel is disclosed. The vessel includes a first electrical power source having a first operational capacity and operating at a first power output, a second electrical power source having a second operational capacity, greater than the first operational capacity, and operating at a second power output, an electrical distribution circuit configured to harness the first power output and the second power output to produce a combined power output for an initial electrical power demand of the vessel, and a power-source controller. The power-source controller is configured to determine increased zone parameters to operate the first electrical power source and the second electrical power source to output electrical power in an increased output power range that is greater than the combined power output. The increased zone parameters include a first planned power output for the first electrical power source and a second planned power output for the second electrical power source that is constrained to be less than the first operational capacity. The power-source controller is further configured to determine decreased zone parameters to operate the first electrical power source and the second electrical power source to output power in a decreased output power range that is less than the combined power output. The decreased zone parameters include a third planned power output for the first electrical power source and a fourth planned power output for the second electrical power source that is constrained to be less than the first operational capacity. The power-source controller detects one of a transient increase of the initial power demand that is within the increased output power range and a transient decrease of the initial power demand that is within the decreased output power range. Responsive to detecting the transient increase, the power-source controller causes the first electrical power source to operate at the first planned power output and causes the second electrical power source at the second planned power output. Responsive to detecting the transient decrease, the power-source controller causes the first electrical power source to operate at the third planned power output and causes the second electrical power source at the fourth planned power output.

These and other aspects and features of the present disclosure will be more readily understood when read in conjunction with the accompanying drawings.

BRIEF DESCRIPTION OF THE DRAWINGS

FIG. 3 depicts a first table of operational parameters, in accordance with an embodiment of the present disclosure.

FIG. 4 depicts a second table of operational parameters, in accordance with an embodiment of the present disclosure.

DETAILED DESCRIPTION

Figure 1:
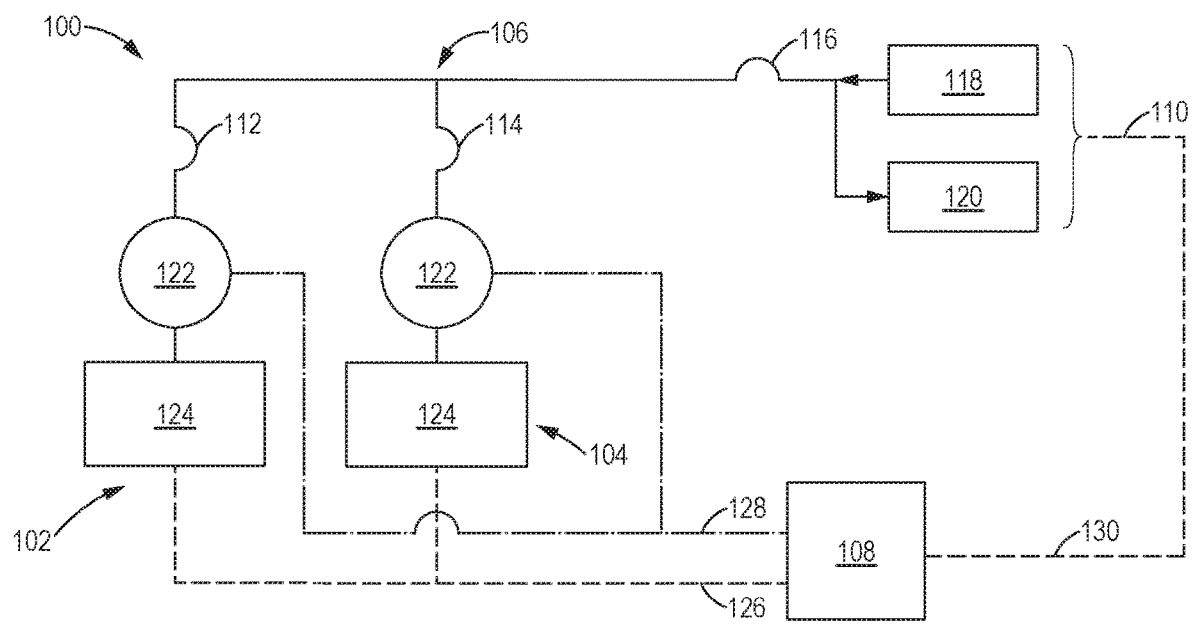
FIG. 1 is a diagram of a power distribution system, in accordance with an embodiment of the present disclosure.

Referring now to the drawings, and with specific reference to FIG. 1, a system 100 is shown. The system 100 may be a power distribution system and include a first power source 102 and a second power source 104. By way of example, the power sources 102, 104 may each include a generator 122 mechanically coupled to an engine 124 to form generator sets. Below, some aspects refer to the parameters from tables 300 and 400 for FIGS. 3 and 4. Example engines 124 include diesel engines, hydrocarbon engines, and the like to combust fuel and air to produce mechanical forces. In one such example, the first power source 102 is configured to provide an first initial power output 302 and the second power source 104 is configured to provide a second initial power output 306. In other embodiments, the mechanical output of the engine 124 may be routed directly to a load (e.g., via a drive shaft or to a propeller shaft) to provide mechanical power to various mechanical loads.

Figure 2:
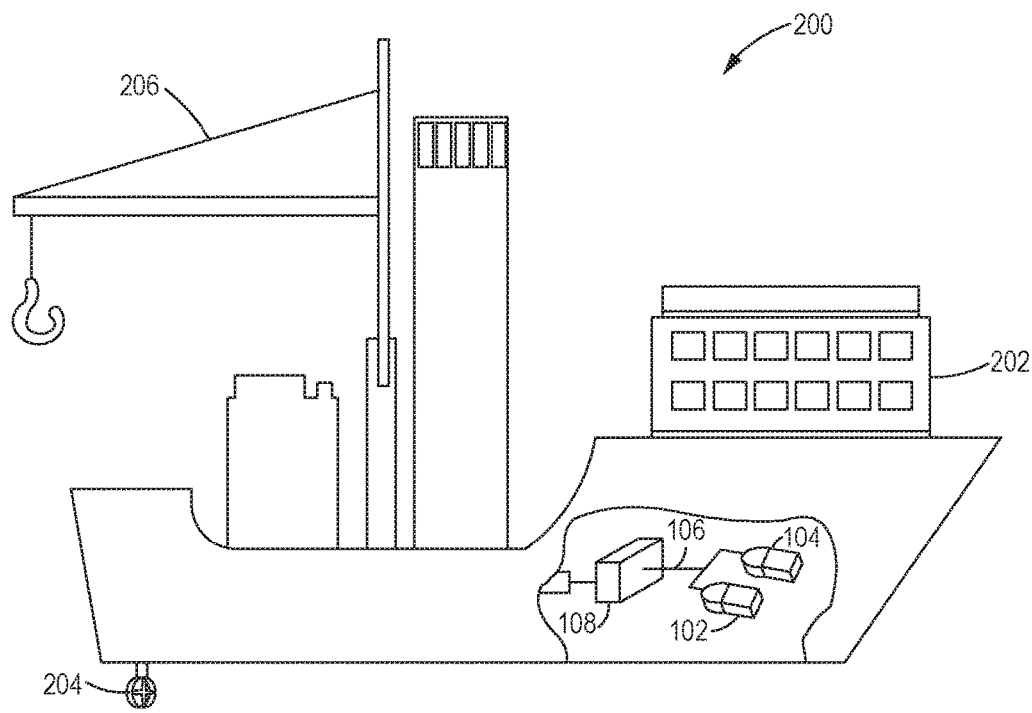
FIG. 2 is a perspective view of a vessel, in accordance with an embodiment of the present disclosure.

FIG. 2 depicts a perspective view of a vessel, in accordance with an embodiment of the present disclosure. In particular, FIG. 2 depicts the perspective view 200 of the vessel 202. By way of example, aspects of the system 100 may be incorporated into the vessel 202. As seen in the cut-away, the vessel 202 includes the first power source 102, the second power source 104, an electrical distribution circuit 106, and a power-source controller 108. Example electrical loads powered by the system 100 may include a thruster 204, a crane 206, or the like. Although FIG. 2 depicts the system 100 within the vessel 202, other uses, such as locomotive, mining equipment, remote power grids, and the like, are envisioned.

Returning to FIG. 1, the system 100 may include different capacity power sources. As such, the first power source 102 may have a first operational capacity 304 and the second power source 104 may have a second operational capacity 308 that is greater than the first operational capacity 304. For example, the first power source 102 may have the first operational capacity 304 of 500 kW and the second power source 104 may have the second operational capacity 308 of 750 kW. In other embodiments, the second operational capacity 308 is at least one-quarter greater than the first operational capacity 304.

An electrical distribution circuit 106 is configured to harness the first initial power output 302 and the second initial power output 306 to produce a combined power output 310 for an initial power demand 110. The electrical distribution circuit 106 may include various breakers 112, 11.4, and 116. The power demand 110 may include various loads and/or power supplies. For example, an electrical load 120 may include all electrical loads that are able to be powered by the first and second power sources 102, 104. In the scope of a maritime vessel, such electrical loads may include thrusters, cranes, hydraulic pumps, electronic systems, and the like. The power demand 110 may further be supplemented by an external power source 118. As such, the external power source 118 may be combined with the output of the first and second power sources 102, 104 to provide power to the electrical loads 120.

A power-source controller 108 is configured to monitor the power demand 110 and the first and second power sources 102, 104 to control the operations of the first and second power sources 102, 104. The power-source controller 108 may be configured to determine zone parameters to operate the plurality of power sources to meet transient, or changing, electrical loads 120.

In general, the first power source 102 and the second power source 104 may be operated in a steady state initial condition, each sharing a portion of the load, to provide an initial combined power output 310. The power-source controller 108 may calculate a fuel optimization plan that determines the proportion of the load each of the power sources in the plurality of power sources supplies. The power-source controller 108 may perform real-time measurements of the operating conditions of the power sources and determine real-time optimizations for controlling the power sources. The power-source controller 108 may monitor and control aspects of the power sources 102, 104 and the power demand 110 via control paths 126, 128, and 130.

In one embodiment, the power-source controller 108 determines increased zone parameters 402 and decreased zone parameters 412 of the table 400 of FIG. 4. The increased zone parameters 402 are planned operating parameters to operate the first power source 102 and the second power source 104 to output power at an increased output power range 410 that is greater than the initial combined power Output 310. Similarly, the decreased zone parameters 412 are planned operating parameters to operate the first power source 102 and the second power source 104 to output power at a decreased output power range 420 that is less than the initial combined power output 310.

The various zones described herein are determined in advance, for example, while operating at steady-state conditions. The advanced determination allows the power sources to more promptly transition their respective power outputs to meet the transient demand. In constraining one of the operational capacities, for example by constraining the larger operational capacity to that of the smaller operational capacity, large swings in loads may be prevented as the system 100 responds to the transient increases. Without such constraints and pre-determined zone parameters, large swings of in either one or both of the power sources 102, 104 may occur.

Such determinations provide for planning of output powers of the power sources during a transient to the electrical loading. The increased zone parameters 402 include a first planned power output 404 for the first power source 102 and a second planned power output 406 for the second power source 104 to operate the power sources 102, 104 in an increased output power range 410. Similarly, the decreased zone parameters 412 include a third planned power output 414 for the first power source 102 and a fourth planned power output 416 for the second power source 104 to operate the power sources 102, 104 in a decreased output power range 420. The second planned power output 406 and the fourth planned power output 416 are constrained to be less than the first operational capacity 304. Thus, the second power source 104 having the larger operational capacity is constrained to have the smaller operational capacity of first power source 102 for the purposes of determining planned power outputs of the second power source 104.

The power-source controller 108 is configured to detect transients in the power demand 110. For example, transients may include the starting and stopping of electro-mechanical loads, changes in load supplied by the external power source 118, and the like.

Responsive to detecting a transient increase of the initial power demand 310 that is within the increased output power range 410, the power-source controller 108 causes the first power source 102 to operate at the first planned power output 404 and causes the second power source 104 to operate at the second planned power output 406. Thus, when responding to the transient increase of the initial power demand, both the first power source 102 and the second power source 104 provide a respective output power that is constrained to be within the first operational capacity 304.

Responsive to detecting a transient decrease of the initial power demand that is within the decreased output power range 420, the power-source controller 108 causes the first power source 102 to operate at the third planned power output 414 and causes the second power source 104 to operate at the fourth planned power output 416. Thus, when responding to the transient decrease of the initial power demand, both the first power source 102 and the second power source 104 provide a respective output power that is constrained to be within the first operational capacity 304.

The power-source controller 108 may be further configured to calculate a fuel optimization plan for the first power source 102 and for the second power source 104 when determining the increased zone parameters 402 and decreased zone parameters 412. When calculating the fuel optimization plan, the larger power sources operational capacity is constrained to that of the smaller power source. In some embodiments, the planned power outputs (404, 406, 414, 416) are based at least in part on the fuel optimization plan. Because the fuel optimization plan is operating under the artificial constraint of limiting the second power source 104 to the first operational capacity 304, it may produce a sub-optimal fuel optimization plan as compared to a fuel optimization plan that does not contain this artificial constraint.

The power-source controller 108 may further be configured to determine steady-state operating parameters to operate the plurality of power sources at the increased or decreased output power ranges. To determine steady-state operating parameters, the power-source controller 108 may calculate a fuel optimization plan that is based on real-time operating conditions of the plurality of power sources.

Thus, after responding to the detected transient by operating at the planned power outputs, the power-source controller 108 may detect real-time conditions of the power sources 102, 104. These real-time conditions may be used to determine the steady-state fuel optimization plan, and may take on the order of several seconds to minutes to calculate. The power-source controller 108 then causes the first and second power sources 102, 104 to operate per the steady-state operating parameters.

FIGS. 3 and 4 depict a first table of operational parameters and a second table of operational parameters, respectively, in accordance with an embodiment of the present disclosure. In particular, FIGS. 3 and 4 depict the tables 300 and 400 that include a plurality of operating parameters for the first power source 102 and the second power source 104 when operating in a power distributions system, such as the system 100. Here, the first power source 102 has the first operational capacity 304 of 500 kW, and the second power source 104 has the second operational capacity 308 of 750 kW. Remaining aspects of the table 300 and 400 are discussed below.

INDUSTRIAL APPLICABILITY

In general, the teachings of the present disclosure may find applicability in many industries including, but not limited to, construction, agricultural, mining, industrial, commercial, transportation, or marine applications. More specifically, the teachings of the present disclosure may find applicability in any industry a plurality of power sources operating together to provide power to a load.

Figure 5:
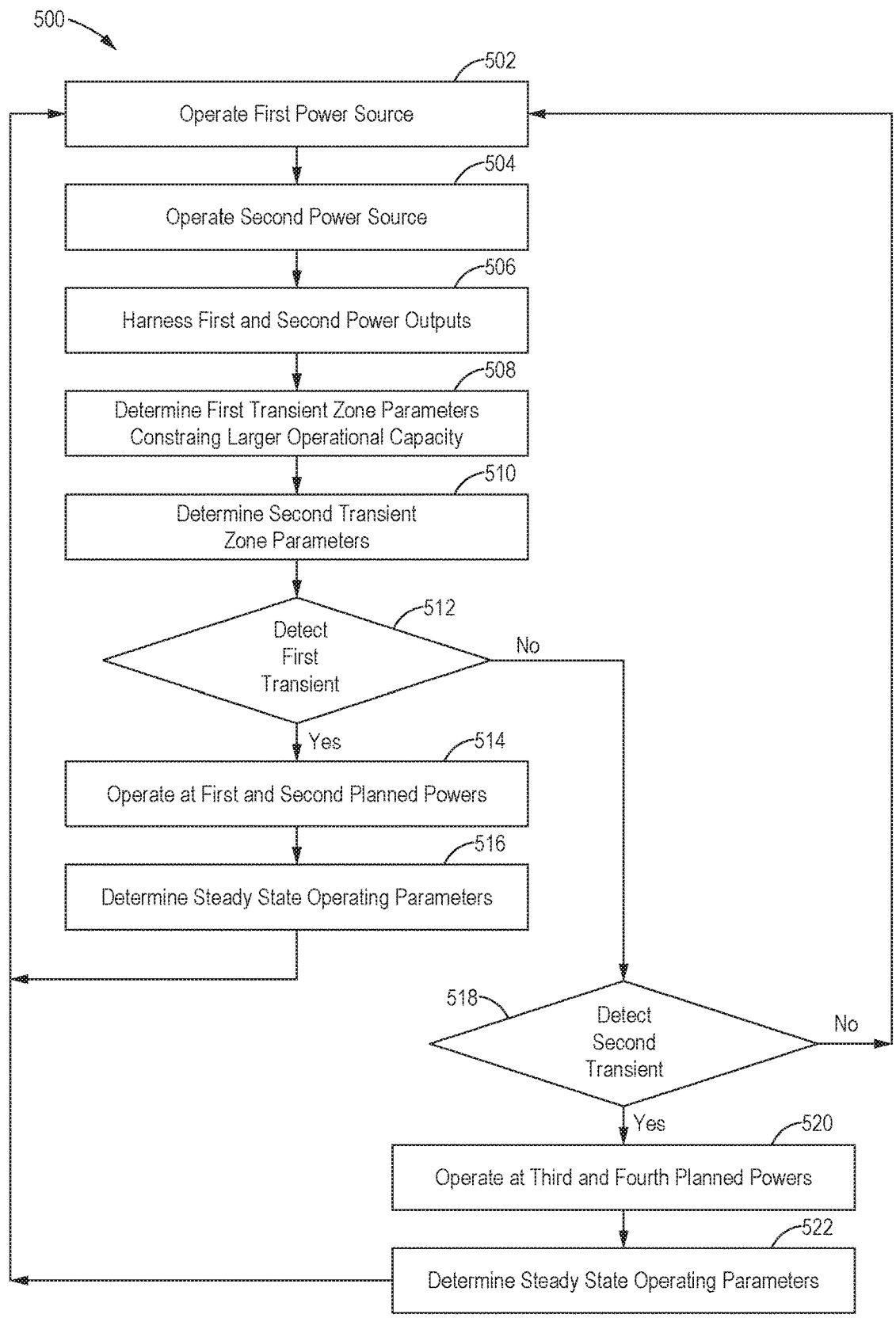
FIG. 5 depicts a first flowchart of a method, in accordance with an embodiment of the present disclosure.

FIG. 5 depicts a first flowchart of a method, in accordance with an embodiment of the present disclosure. In particular, FIG. 5 depicts the method 500 that may be carried out using the system 100 of FIG. 1. While the system 100 depicts a first and a second power source 102, 104, the system 100 may include more power sources. Determining of various zone parameters, steady state parameters, and the like, as well as control of the power sources 102, 104 may be performed by the power-source controller 108. Distribution of the electrical power produced by the power sources 102, 104, may be carried out by the electrical distribution circuit 106. Further, the operating parameters of the table 300 of FIG. 3 are used to describe one embodiment of the present invention.

The method 500 includes operating the first power source at block 502, operating the second power source at block 504, harnessing the first and second power outputs at block 506, determining first transient zone parameters that constrain the larger operational capacity at block 508, and determining second transient zone parameters at block 510. Responsive to detecting the first transient at block 512, the first and second power sources are operated at the first and second planned powers at block 514, and steady state operating parameters are determined at block 516. Responsive to detecting a second transient at block 518, the first and second power sources are operated at the third and fourth planned powers at block 520, and steady state operating parameters are determined at block 522.

Returning to blocks 502 and 504, a first power source 102 is operated at a first initial power output 302 and a second power source 104 is operated at a second initial power output 306. For example, table 300 depicts the first initial power output being 250 kW, having the first power source 102 operating at 50% of its operational capacity. Further, the second power source 104 is operating at 350 kW, or 47% of its operational capacity. At blocks 506, the first initial power output 302 and the second initial power output 306 are harnessed to produce a combined power output 310 of 600 kW for an initial power demand.

At block 508, first transient zone parameters 312 are determined to operate the plurality of power sources to output power in a first transient output power range 314 that is greater than the combined power output 310. Here, the first transient zone parameters 312 are determined for a first transient output power range 314 of between 700 kW to 750 kW. By way of example, table 300 depicts the first planned power output 316 for the first power source 102 to be 275 kW and the second planned power output 318 for the second power source 104 to be between 425 kW to 475 kW.

In determining the second planned power output 318, the second planned power output 318 is artificially constrained. For example, it may be constrained to be equal to the first operational capacity 304. In some embodiments, a fuel optimization plan for the first power source 102 and for the second power source 104 that is constrained to the first operational capacity 304 is determined. The first planned power output 316 and the second planned power output 318 may be based in part on this fuel optimization plan. Thus, the first and second planned power outputs 316, 318 may provide for fuel efficient operations under the artificial constraints to the second power source 104.

Although only one set of first transient zone parameters 312 are depicted in the table 300, additional zones may similarly be determined for other power ranges. Any number of zones may be determined above and/or below the initial combined power output 310 to provide a broader range of operations of the system 100. In some embodiments, the first transient increase is at least ten percent of the initial power demand.

In some embodiments, second transient zone parameters 330 may be determined. The first transient zone parameters 312 were directed at determining planned output powers for the power sources that are below a sum of the first operational capacity 304 and the constrained operational capacity of the second power source 104. However, to provide for the system 100 to respond to transients that result in a power demand above the artificially constrained limits of the system 100, the second transient zone parameters 330 may be determined. In embodiments where the second operational capacity 308 is being constrained to the first operational capacity 304, the second transient zone parameters 330 are directed at transients that draw power more than double the first operational capacity 304.

The second transient zone parameters 330 include a third planned power output 334 for the first power source 102 and a fourth planned power output 336 for the second power source 104. A sum of the third planned power output 334 and the fourth planned power output 336 are within the second transient output power range 332.

As depicted in the table 300, the second transient zone parameters 330 are for a second transient output power range 332 of between 1000 kW and 1050 kW. This exceeds double the first operational capacity 304 of double 500 kW. As such, the third planned power output 334 is determined to be 450 kW, or 90% of its operational capacity, and the fourth planned power output 336 is between 550 kW and 600 kW, or between 73% and 80% of its operational capacity. The fourth planned power output 336 is not constrained in such an embodiment.

At block 512, responsive to detecting a first transient increase to the initial power demand 110 that is within the first transient output power range 314, the first power source 102 is operated at the first planned power output 316 and the second power source 104 is operated at the second planned power output 318 to meet the first transiently increased power demand at block 514. Thus, per the table 300, the first power source 102 will operate at 275 kW and the second power source 104 will operate at between 425 kW and 475 kW. These power outputs may be harnessed together to produce the first transiently increased power demand 320 of between 700 kW and 750 kW. As noted above, the second power source 104 is operating at the second planned power output 318 that is artificially constrained.

At block 518, responsive to detecting a second transient increase to the initial power demand 110 that is within the second transient output power range 332, the first power source 102 is operated at the third planned power output 334 and the second power source 104 is operated at the fourth planned power output 336 to meet the second transiently increased power demand at block 520. Thus, per the table 300, the first power source 102 will operate at 450 kW and the second power source 104 will operate at between 550 kW and 600 kW. These power outputs may be harnessed together to produce the second transiently increased power demand 338 of between 1000 kW and 1050 kW. As noted above, the second power source 104 is operating at the fourth planned power output 336 that is not artificially constrained.

At blocks 516 and 522, steady state operating parameters may be determined to operate the power sources 102, 104 at the new power levels. As discussed above, these steady state operating parameters may be based on real-time conditions of the power sources 102, 104 and further include a fuel optimization plan that is determined at those new power levels and operating conditions.

The steady state operating parameters may be determined after operating per the first transient zone parameters 312 or the second transient zone parameters 330. The steady state operating parameters 322 of the table 300 depict exemplary steady state operating parameters determined subsequent to operating at the first and second planned power outputs 316, 318 of the first transient zone parameters 312. For example, a first power source steady state output power 324 may be 270 kW, or 54% of its operational capacity, and a second power source steady state output power 326 may be 430 kW, or 57% of its operational capacity. These steady state output powers of the first and second power sources 102, 104 may be combined to a combined steady state output power 328 of 700 kW. Similar steady state parameters may be determined after operating at the second transient zone parameters 330.

Figure 6:
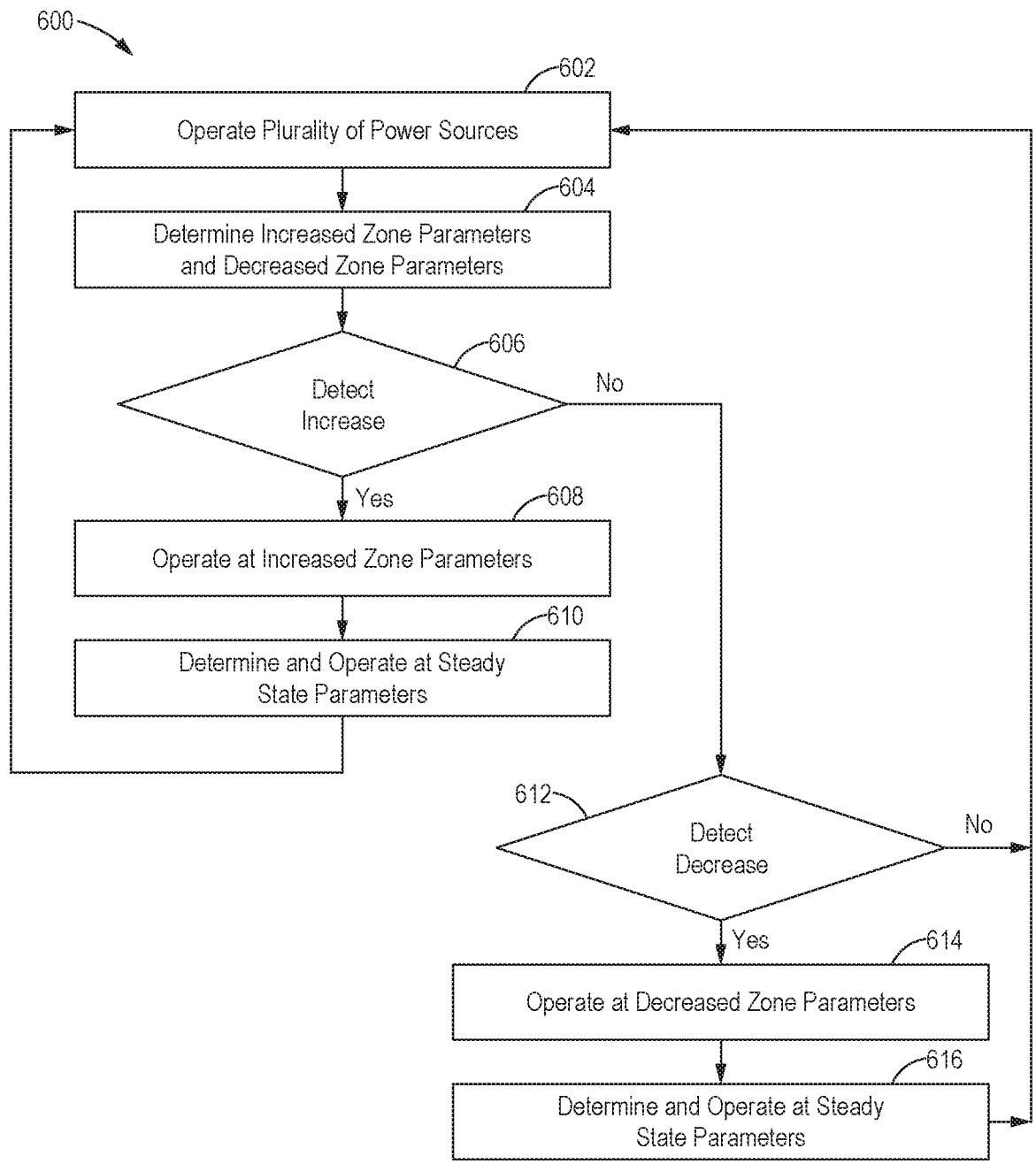
FIG. 6 depicts a second flowchart of a method, in accordance with an embodiment of the present disclosure.

FIG. 6 depicts a second flowchart of a method, in accordance with an embodiment of the present disclosure. Similar to FIG. 5, FIG. 6 depicts the method 600 that may be carried out with the system 100. The method 500 of FIG. 5 was related, in part, to determining first transient zone parameters 312 that includes an artificially constrained power output, and determining second transient zone parameters 330 that did not include an artificially constrained power output. Here in FIG. 6, the method 600 discloses, in part, determining both increased and decreased zone parameters from the initial power demand. The operating parameters of table 400 of FIG. 4 are used to depict an exemplary embodiment of the method 600.

The method 600 includes operating a plurality of power sources at block 602, determining increased zone parameters and decreased zone parameters at block 604, detecting an increase at block 606, operating at the increased zone parameters at block 608, determining and operating at steady state parameters at block 610, and returning to block 602. Responsive to detecting a decrease at block 612, the method further includes operating at decreased zone parameters at block 614, determining and operating at steady state parameters at block 616, and returning to block 602.

At block 602, a plurality of power sources (e.g., first power source 102 and second power source 104) are operated at their initial powers that are carried over from the table 300 of FIG. 4.

At block 604, increased zone parameters 402 are determined for the increased output power range 410 of between 700 kW and 750 kW. This includes a first planned power output 404 of 275 kW, or 55% of its operational capacity, for the first power source 102 and a second planned power output 406 of between 425 kW and 475 kW, or between 56% to 63% of its operational capacity, for the second power source 104. This produces a combined increased power output 408 of between 700 kW to 750 kW.

Further, decreased zone parameters 412 are determined for the decreased output power range 420 of between 500 kW to 550 kW. This includes a third planned power output 414 for the first power source 102 and a fourth planned power output 416 for the second power source 104. This produces a combined decreased power output 418 of between 500 kW to 550 kW.

In both the increased zone parameters 402 and the decreased zone parameters 412, the respective second planned power output 406 and the fourth planned power output 416 are artificially constrained.

As discussed herein, determining the increased zone parameters and the decreased zone parameters may include calculating a fuel optimization plan for the power sources that artificially constrain one of the power sources. For example, the fuel optimization plan may determine a fuel efficient plan of operations under the constraint that the second power source 104 is artificially constrained to the first operational capacity 304.

At block 606, responsive to detecting a transient increase of the initial power demand that is within the increased output power range 410, the first power source 102 is caused (block 608) to operate at the increased zone parameters 402 having the first planned power output 404. Further, the second power source 104 is caused (block 608) to operate at the increased zone parameters 402 having the second planned power output 406.

At block 612, responsive to detecting a transient decrease of the initial power demand that is within the decreased output power range 420, the first power source 102 is caused (block 614) to operate at the decreased zone parameters 412 having the third planned power output 414. Further, the second power source 104 is caused (block 614) to operate at the decreased zone parameters 412 having the fourth planned power output 416.

At blocks 610 and 616, steady-state operating parameters may be determined after each of the transient increase (block 608) and transient decrease (block 614) that are based, in part, on real-time parameters of the power sources 102, 104.

The system may continue to operate the plurality of power sources at block 602 while preparing to operate during the next transient. For example, using the vessel 202 of FIG. 2, the plurality of power sources may be operating at an initial combined power output 310 of 600 kW. If the thruster 204 is energized, the system 100 may detect a transient increase that corresponds to the first transient output power range 314. The power-source controller 108 causes the first and second power sources 102, 104 to operate per the first transient zone parameters 312 that include an artificial constraint on the second power source 104.

In a different example, if both the thruster 204 and the crane 206 are energized simultaneously, the system 100 may detect a transient increase that corresponds to the second transient output power range 332. The power-source controller 108 causes the first and second power sources 102, 104 to operate per the second transient zone parameters 330 that does not include an artificial constraint on the second power source 104.

In yet another example, the vessel 202 having the system 100 is operating at the initial power combined output 310 of 600 kW, which includes the thruster 204 being energized. If at this state the thruster 204 is deenergized, the system 100 may operate per the decreased zone parameters 412 of FIG. 4. If however rather than the thruster 204 being deenergized, the crane 206 is energized, the system 100 may operate per the increased zone parameters 402 of FIG. 4.

In some embodiments, a power-source controller 108 is configured to determine both first transient zone parameters 312 and second transient zone parameters 330 as well as increased zone parameters 402 and decreased zone parameters 420. Thus, the power-source controller 108 is capable of operating the first and second power sources 102, 104 in many different types of detected transients.

What is claimed is:

1. A method of operating a plurality of power sources, the method comprising:
    operating a first power source in the plurality of power sources at a first power output, the first power source having a first operational capacity;
    operating a second power source in the plurality of power sources at a second power output, the second power source having a second operational capacity greater than the first operational capacity;
    harnessing the first power output and the second power output to produce a combined power output for an initial power demand;
    determining first transient zone parameters to operate the plurality of power sources to output power in a first transient output power range that is greater than the combined power output, the first transient zone parameters having:
        a first planned power output for the first power source; and
        a second planned power output for the second power source, the second planned power output being constrained to be less than the first operational capacity, wherein a sum of the first planned power output and the second planned power output is within the first transient output power range;
    responsive to detecting a first transient increase to the initial power demand that is within the first transient output power range, operating the first power source at the first planned power output and operating the second power source at the second planned power output to meet the first transiently increased power demand.

2. The method of claim 1, wherein:
    determining the first transient zone parameters comprises calculating a fuel optimization plan for the first power source and for the second power source that is constrained to the first operational capacity; and
    the first planned power output and the second planned power output are based at least in part on the fuel optimization plan.

3. The method of claim 2, further comprising determining steady state operating parameters to operate the plurality of power sources to output power at the first transiently increased power demand.

4. The method of claim 3, wherein determining the steady state operating parameters comprises calculating a steady-state fuel optimization plan based at least in part on real-time operating conditions of the plurality of power sources.

5. The method of claim 1, further comprising:
determining second transient zone parameters to operate the plurality of power sources to output a second transient output power range, the second transient output power being more than double the first operational capacity, the second transient zone parameters having:
a third planned power output for the first power source; and
a fourth planned power output for the second power source, the fourth planned power output being greater than the first operational capacity, wherein a sum of the third planned power output and the fourth planned power output are within the second transient output power range;
detecting a second transient increase of the initial power demand corresponding to second transient output power range; and
responsive to detecting the second transient increase, operating the first power source at the third planned power output and operating the second power source at the fourth planned power output.

6. The method of claim 5, wherein determining the second transient zone parameters comprises calculating a fuel optimization plan for the first power source and the second power source, and the third planned power output and the fourth planned power output are based at least in part on the fuel optimization plan.

7. The method of claim 6, further comprising determining steady state operating parameters to operate the plurality of power sources to output power at the second transiently increased power demand.

8. The method of claim 7, wherein determining the steady state operating parameters comprises calculating a steady-state fuel optimization plan based at least in part on real-time operating conditions of the plurality of power sources.

9. The method of claim 1, wherein the plurality of power sources are configured to output electrical power.

10. The method of claim 1, wherein the first transient increase is at least ten percent of the initial power demand.

11. A system comprising:
a first power source having a first operational capacity;
a second power source having a second operational capacity that is greater than the first operational capacity;
an electrical distribution circuit configured to harness a first power output from the first power source and a second power output from the second power source to produce a combined power output for an initial power demand;
a power-source controller configured to:
determine increased zone parameters to operate the first power source and the second power source to output power in an increased output power range that is greater than the combined power output, wherein the increased zone parameters include a first planned power output for the first power source and a second planned power output for the second power source that is constrained to be less than the first operational capacity;
determine decreased zone parameters to operate the first power source and the second power source to output power in a decreased output power range that is less than the combined power output, wherein the decreased zone parameters include a third planned power output for the first power source and a fourth planned power output for the second power source that is constrained to be less than the first operational capacity;
detect one of a transient increase of the initial power demand that is within the increased output power range and a transient decrease of the initial power demand that is within the decreased output power range;
responsive to detecting the transient increase, causing the first power source to operate at the first planned power output and causing the second power source to operate at the second planned power output; and
responsive to detecting the transient decrease, causing the first power source to operate at the third planned power output and causing the second power source to operate at the fourth planned power output.

12. The system of claim 11, wherein:
the power-source controller being configured to determine increased zone parameters comprises the power-source controller calculating a fuel optimization plan for the first power source and for the second power source that is constrained to the first operational capacity; and
the first planned power output and the second planned power output are based at least in part on the fuel optimization plan.

13. The system of claim 11, wherein:
the power-source controller being configured to determine the decreased zone parameters comprises the power-source controller calculating a fuel optimization plan for the first power source and for the second power source that is constrained to the first operational capacity; and
the third planned power output and the fourth planned power output are based at least in part on the fuel optimization plan.

14. The system of claim 11, the power-source controller being further configured to determine increased steady state operating parameters to operate the first and second power sources to output power at the increased output power range.

15. The system of claim 14, wherein determining increased steady state operating parameters comprises calculating a steady-state fuel optimization plan based at least in part on real-time operating conditions of the first and second power sources.

16. The system of claim 14, the power-source controller being further configured to determine decreased steady state operating parameters to operate the first and second power sources to output power at the decreased output power range.

17. The system of claim 16, wherein determining decreased steady state operating parameters comprises calculating a steady-state fuel optimization plan based at least in part on real-time operating conditions of the plurality of power sources.

18. A vessel comprising:
a first electrical power source having a first operational capacity and operating at a first power output;
a second electrical power source having a second operational capacity greater than the first operational capacity and operating at a second power output;
an electrical distribution circuit configured to harness the first power output and the second power output to produce a combined power output for an initial electrical power demand of the vessel;

a power-source controller configured to:
- determine increased zone parameters to operate the first electrical power source and the second electrical power source to output electrical power in an increased output power range that is greater than the combined power output, wherein the increased zone parameters include a first planned power output for the first electrical power source and a second planned power output for the second electrical power source that is constrained to be less than the first operational capacity;
- determine decreased zone parameters to operate the first electrical power source and the second electrical power source to output power in a decreased output power range that is less than the combined power output, wherein the decreased zone parameters include a third planned power output for the first electrical power source and a fourth planned power output for the second electrical power source that is constrained to be less than the first operational capacity;
- detect one of a transient increase of the initial power demand that is within the increased output power range and a transient decrease of the initial power demand that is within the decreased output power range;
- responsive to detecting the transient increase, causing the first electrical power source to operate at the first planned power output and causing the second electrical power source at the second planned power output; and
- responsive to detecting the transient decrease, causing the first electrical power source to operate at the third planned power output and causing the second electrical power source at the fourth planned power output.

19. The vessel of claim 18, wherein the second operational capacity is at least one-quarter greater than the first operational capacity.

20. The vessel of claim 18, wherein a vessel thruster energizing causes the transient increase and the vessel thruster de-energizing causes the transient decrease.

* * * * *